United States Patent
Brozowski et al.

(10) Patent No.: US 6,559,871 B1
(45) Date of Patent: May 6, 2003

(54) ASYNCHRONOUS TREE NAVIGATOR GRAPHICAL USER INTERFACE AND ASSOCIATED METHODS

(75) Inventors: Mathew James Brozowski, Durham, NC (US); Richard E. Cordes, Chapel Hill, NC (US); Colleen L. DeJong, Morrisville, NC (US); Susan M. Hanson, Apex, NC (US); Matthew D. Walnock, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/408,814

(22) Filed: Sep. 29, 1999

(51) Int. Cl.⁷ .................................................. G09G 5/00
(52) U.S. Cl. ...................... 345/853; 345/854; 345/764; 345/748; 345/835
(58) Field of Search ................................. 345/739, 854, 345/764, 853, 748, 835, 440, 34.7, 119, 353, 145, 808, 841

(56) References Cited

U.S. PATENT DOCUMENTS

| | | | | |
|---|---|---|---|---|
| 5,257,349 A | | 10/1993 | Alexander | 395/159 |
| 5,333,254 A | * | 7/1994 | Robertson | 345/155 |
| 5,414,836 A | * | 5/1995 | Baer et al. | 345/575 |
| 5,524,199 A | | 6/1996 | Orton et al. | 395/157 |
| 5,535,325 A | | 7/1996 | Cattell et al. | 395/161 |
| 5,544,051 A | | 8/1996 | Senn et al. | 364/419.19 |
| 5,544,295 A | | 8/1996 | Capps | 395/152 |
| 5,555,362 A | * | 9/1996 | Yamashita et al. | 345/145 |
| 5,555,368 A | | 9/1996 | Orton et al. | 395/157 |
| 5,608,899 A | | 3/1997 | Li et al. | 395/604 |
| 5,621,905 A | * | 4/1997 | Jewson et al. | 345/353 |
| 5,649,085 A | | 7/1997 | Lehr | 395/140 |
| 5,701,137 A | * | 12/1997 | Kiernan et al. | 345/119 |
| 5,734,884 A | | 3/1998 | Eberhard et al. | 395/602 |
| 5,761,656 A | | 6/1998 | Ben-Shachar | 707/4 |
| 5,764,913 A | | 6/1998 | Jancke et al. | 395/200.54 |
| 5,801,698 A | | 9/1998 | Lection et al. | 345/347 |
| 6,128,016 A | * | 10/2000 | Coelho et al. | 345/347 |
| 6,137,499 A | * | 10/2000 | Tesler | 345/440 |
| 6,259,451 B1 | * | 7/2001 | Tesler | 345/419 |
| 6,311,320 B1 | * | 10/2001 | Jibbe | 717/1 |

OTHER PUBLICATIONS

Internet screen shot, http://home.netscape.com/ (Netscape Communicator 4.6) Oct. 7, 1999.
Internet screen shot, http://cnn.com/ (Connect: Contacting host: a388.g.akamaitech.net . . . ) Oct. 7, 1999.
Internet screen shot, http://cnn.com/ (with pop-up menu) Oct. 7, 1999.
Internet screen shot, http://cnn.com/WEATHER/9909.29/floyd.02/ Oct. 7, 1999.

(List continued on next page.)

*Primary Examiner*—Kristine Kincaid
*Assistant Examiner*—Mylinh T Tran
(74) *Attorney, Agent, or Firm*—Myers Bigel Sibley & Sajovec, P.A.; Jeanine S. Kay-Yarletts

(57) ABSTRACT

Tree navigator graphical user interfaces are provided which execute on user queries for data asynchronously, and which may display information obtained as a result of a query as soon as it is available, even though additional responsive information is not yet available. These tree navigator graphical user interfaces may also be designed to anticipate future queries for data based on past or current queries, and pre-load data into the graphical user interface which is responsive to the anticipated future queries. The tree navigator graphical user interfaces may additionally use "placeholder objects" and "loading icons" to notify the user regarding the loading status of the data associated with a particular branch of the tree.

22 Claims, 12 Drawing Sheets

OTHER PUBLICATIONS

Internet screen shot, http://javaboutique.internet.com/Jexplorer/demo.html (Transferring data from javaboutique.inte . . . ) Oct. 7, 1999.

Internet screen shot, http://javaboutique.internet.com/Jexplorer/demo.html (Load test file test2.txt from disk into new . . . ) Oct. 7, 1999.

Bowbeer, "The Last Word in Swing Threads, Working with Asynchronous Models", http://java.sun.com/products/jfc/tsc/tech_topics/threads3/threads3.html Oct. 7, 1999.

Muller et al., "Threads and Swing," http://java.sun.com/products/jfc/tsc/archive/tech_topics_arch/threads/threads.html, Apr., 1998.

Muller et al., "Using a Swing Worker Thread, New Ways to Perform Background Tasks," http://java.sun.com/products/jfc/tsc/archive/tech_topics_arch/swing_workerswing_worker.html, Jul., 1998.

* cited by examiner uk# ASYNCHRONOUS TREE NAVIGATOR GRAPHICAL USER INTERFACE AND ASSOCIATED METHODS

FIELD OF THE INVENTION

The present invention relates generally to graphical user interfaces for computer systems. More particularly, the present invention relates to "tree navigator" graphical user interfaces for representing and manipulating hierarchical data in computer applications and systems.

BACKGROUND OF THE INVENTION

Over the last two decades, significant increases in personal computer processing capability and equally significant decreases in the cost of such computers has led to the proliferation of personal computers in many aspects of society. Thus, today personal computers are heavily utilized in schools, homes and in business. One factor fueling this proliferation of computers throughout numerous aspects of life has been the introduction and expanded use of graphical user interfaces, which have greatly simplified and made .more intuitive both computer operating systems and applications. This simplification has allowed less sophisticated computer users to readily use computers for many applications.

Today, the vast majority of personal computer operating systems and application programs are accessed by users via a graphical user interface. Examples of such operating systems are IBM® OS/2®, Apple® System 7®, and Microsoft® Windows®, and example applications include Microsoft Windows Explorer®, Lotus Notes® and Word Perfect®.

A wide variety of operating systems and computer application programs incorporate, display and/or perform operations on data or information which is hierarchical in nature. For example, numerous computer operating systems and application programs provide users access to a hierarchy of directories and sub-directories where documents, programs, e-mail messages and other information are stored. Similarly, organizer applications allow a user to establish task listings, which once again are often hierarchical in nature.

With the advent and expanded use of graphical user interfaces, such hierarchical information or data is often displayed to the user in a "tree representation." These tree representations visually indicate the level in the hierarchy where each item of data resides, and may allow a user to "expand" or "collapse" the tree at various points (i.e., displaying or hiding information in the lower levels) to facilitate a user's viewing of the hierarchical data. (Note that herein the "lowest" level of a tree representation is defined as the level which is furthest from the root of the tree.)

A wide variety of computer programs are known in the art for providing a "tree navigator" graphical user interface to the user. By a "tree navigator" graphical user interface it is meant a graphical user interface that displays (and possibly allows for manipulation of) hierarchical data in a tree representation. By way of example, FIG. 1 is a screen capture of a prior art application having a tree navigator graphical user interface (Microsoft Corporation's Windows Explorer). In the tree navigator graphical user interface of FIG. 1, the left hand portion of the figure includes a tree view display window (a window that displays hierarchical data in a tree representation). This tree navigator graphical user interface also contains a second display area adjacent the tree view display that contains data associated with the hierarchical data displayed in the tree view display.

As the use of such tree navigator graphical user interfaces has expanded, so has the complexity of many of the hierarchical data sets that are provided to the user in tree representation. For example, hierarchical data sets having thousands upon thousands of branches are now common, and this data is often stored on multiple, geographically dispersed network server devices. In many instances, to view and/or manipulate this data may require many successive queries to the device(s) on which the data is stored to retrieve new portions of the data. If the data is stored on a "back-end" data store (a data storage device at a remote location from the user), the response of a tree navigator graphical user interface may become subject to significant delays if large amounts of data must be loaded and/or because of limitations in network communications resources. Such delays are almost inevitably frustrating to users, and can also result in confusion as the user may not know whether the computer is in the process of responding to a query or has instead "locked-up" or otherwise failed to respond.

Despite these needs, prior tree navigator graphical user interfaces typically have not contained features which address the problems which may arise when the size or the distributed nature of the hierarchical data set negatively impacts the responsiveness of the graphical user interface. Accordingly, there is a need for improvements in tree navigator graphical user interfaces.

SUMMARY OF THE INVENTION

In view of the above limitations associated with existing tree navigator graphical user interfaces, it is an object of the present invention to provide graphical user interfaces having improved responsiveness.

It is another object of the present invention to provide tree navigator graphical user interfaces which unobtrusively provide the user more information regarding the status of queries for data.

Other objects, features and advantages of the present invention will become apparent upon reading the following detailed description and appended claims and upon reference to the accompanying drawings.

The above-mentioned objects of the present invention may be provided by tree navigator graphical user interfaces which execute on user queries for data asynchronously. In this manner, the user of the interface may continue to view and manipulate the data displayed by the graphical user interface while awaiting the response to a prior request to load data into the interface. Additionally, the tree navigator graphical user interfaces of the present invention may display information obtained as a result of a query as soon as it is available, even though additional responsive information is not yet available. This feature allows the user to start operations on a desired portion of the requested data as soon as it is available, without awaiting the complete response to the query for data. Pursuant to another aspect of the present invention, the graphical user interface may be programmed to anticipate future queries for data based on past or current queries, and pre-load data into the graphical user interface which is responsive to the anticipated future queries. For instance, after responding to a request to load data associated with a particular branch in the tree, the interface program may load some or all of the data associated with the branches of the tree that depend on the branch in question, in anticipation that the user will request such data associated with one or more of the "child" branches in the near future. Moreover, the tree navigator graphical user interfaces of the present invention may use "placeholder objects" and "loading icons" to notify the user regarding the loading status of the data associated with a particular branch of the tree. This status information may help to avoid user confusion and may also improve the user's perception as to the responsiveness of the tree navigator graphical user interface.

In one embodiment of the present invention, methods of loading data that is part of a set of hierarchical data into a tree navigator graphical user interface are provided. Pursuant to these methods, a request to load data is received and asynchronously executed upon so as to obtain all available data responsive to the request. Furthermore, a user-generated command may be received subsequent to initiating execution on the request to load data, and execution on this user-generated command may be initiated before the asynchronous execution on the request to load data is completed. Ultimately, the data obtained in response to the request to load data is loaded into the tree navigator graphical user interface, and the method may further include the step of displaying at least a portion of the obtained data in a tree view display which is part of the tree navigator graphical user interface.

In a particular aspect of the present invention, the request to load data may comprise a request to load data associated with a first object that is displayed in the tree view display in tree representation. In this case, the method may further include the step of loading additional data into the tree navigator graphical user interface that is associated with at least one other object displayed in the tree view display (such as the child objects of the first object) in anticipation of a future request to load data. The method may alternatively, or also, further include the step of displaying the first object as a placeholder object during the step of asynchronously executing on the request to load data. If such a placeholder object is used, the method may also include the step of replacing said placeholder object with a normal object once the data associated with the first object has been fully loaded into the tree navigator graphical user interface. In addition to the above-described methods, related systems and computer program products are also provided.

As will be appreciated by those of skill in the art in light of the present disclosure, the methods, systems and computer program products for loading data into a tree navigator graphical user interface asynchronously may provide a number of advantages. First, these methods, systems and computer program products allow a user to view and operate on already loaded portions of the data set while awaiting additional data to load, instead of waiting for the graphical user interface to once again become responsive. Second, the methods, systems and computer program products of the present invention may reduce the frustration that users often experience when their machine "locks-up" pending the completion of a relatively slow operation. Third, if a particular network connection is slow or inoperable, the methods, systems and computer program products of the present invention allow a user to continue working while obtaining data over such a slow or inoperable connection.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, a device, a data processing system or a program product. Accordingly, the present invention may take the form of an entirely hardware embodiment, an entirely software embodiment or an embodiment which combines software and hardware aspects. Furthermore, the present invention may take the form of a computer program product on a computer readable storage medium having computer readable program code means embodied in the medium. Any suitable computer readable medium may be utilized including for example, hard disks, CD-ROMs, optical storage devices, or magnetic storage devices.

As will also be understood by those of skill in the art, the tree navigator graphical user interfaces of the present invention may be implemented as customized program applications and as user interface programming objects. Object oriented techniques are well known to those of skill in the art, and as such, these techniques will not be described in detail herein. However, certain embodiments of the graphical user interfaces of the present invention are described herein in terms of programming objects, and it will be understood that these references to programming objects should be interpreted in light of the understanding in the art regarding object oriented techniques. It should also be noted that other parts of this detailed description (including the claims appended hereto) make reference to "objects" in a tree view display. As discussed in more detail herein, these later references to "objects" are referring to the information displayed in a branch of a tree in a tree view display, and hence should not be confused with the "programming objects" discussed above.

Figure 2:
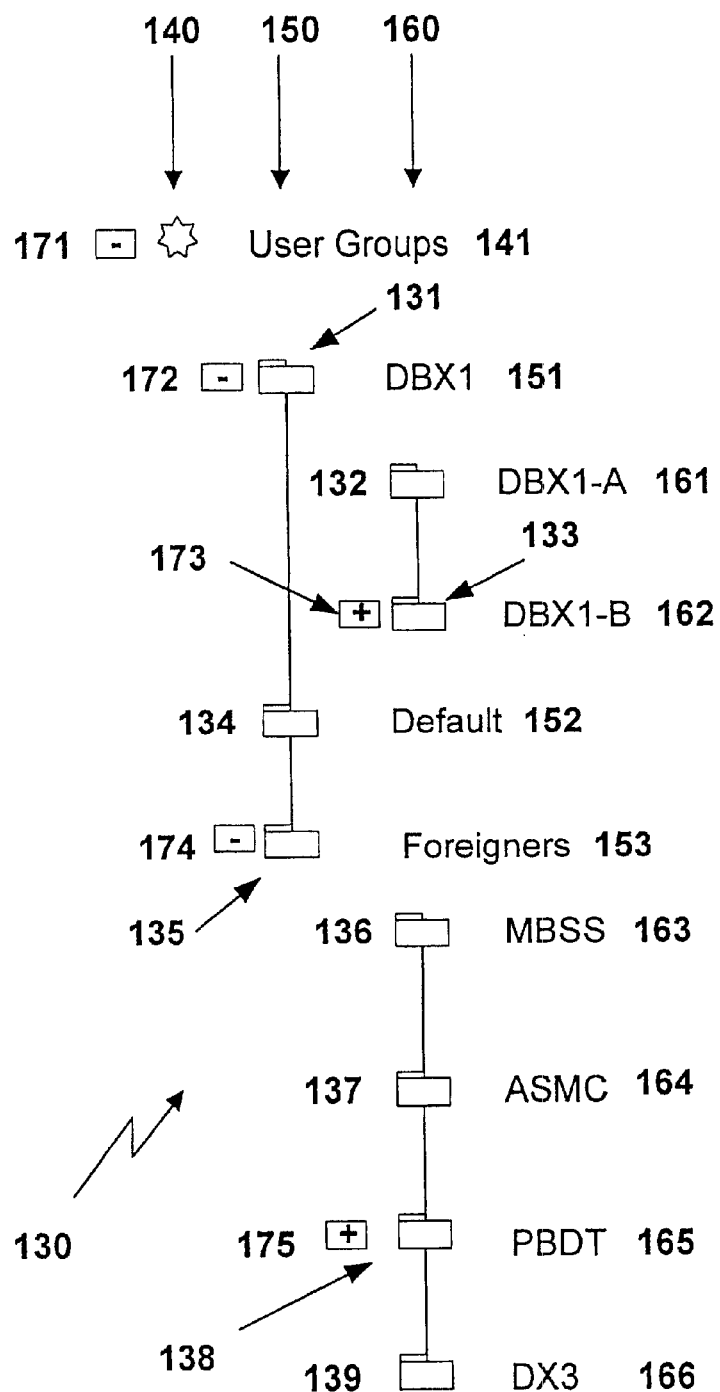
FIG. 2 is schematic diagram depicting data arranged in a tree representation.

As noted above, in a variety of different applications it may be desirable to represent or display data in what is known as a tree representation. FIG. 2 illustrates a representative example of data displayed in such a tree representation, which is generally designated 130.

As will be appreciated by those of skill in the art, tree representations such as the tree representation 130 may be very useful for organizing, displaying, manipulating and modifying data which is hierarchical in nature. The levels of the tree representation visually depict the location of each piece of data in a way that quickly and intuitively conveys to a user both the location of the data within the hierarchy and the relationship of that data to other data in the hierarchy. Moreover, the hierarchical structure may allow users to more quickly and efficiently peruse the data, such as by reviewing the entries at the higher levels to locate particular branches which are most likely to contain information of interest.

As will also be understood by those of skill in the art, the hierarchical data presented in a tree representation may, in some instances, comprise all relevant data, wherein in other instances, the data displayed in the tree representation serves as an index or summary of underlying information which a user may wish to access. For instance, family genealogy information is often displayed using a tree representation, and the information so displayed in many cases may comprise the full listing of hierarchical data. Computer directory structures also comprise data that is often displayed in a tree representation; (see, e.g., FIG. 1) however, in this instance, the user typically uses the tree representation as a means of locating and accessing underlying computer files which may be stored in various directories. In some instances, the tree navigator graphical user interface may provide the user access to this underlying data in a second "data" display, such as the display shown on the right hand side of FIG. 1. In any event, it will be understood that the methods of the present invention are applicable to either type of hierarchical data set or a combination of the two.

As shown in FIG. 2, the tree representation 130 extends horizontally from the left of the page, with the data arranged in a series of levels 140, 150, 160, which are physically offset from each other along the horizontal axis. However, those of skill in the art will appreciate that the tree representation need not be displayed right to left across the page, and instead, for example, could extend from the bottom of the page to the top or from the top of the page to the bottom. It will also be appreciated that a wide variety of different types of data can be represented in a tree representation, and that the concepts of the present invention generally are not limited by the type of hierarchical data.

In the tree representation 130 of FIG. 2, level 140 is the "highest" or "root" level, and level 160 is the "lowest" level. As illustrated in FIG. 2, each level of the tree representation 130 includes one or more "branches. " As will be appreciated by those of skill in the art, a "branch" of a tree refers to an entry in tree representation 130 at a particular level. Thus, for example, level 150 of tree representation 130 includes three branches (the branches which include icons 131, 134, 135), and level 160 includes six branches (the branches which include icons 132, 133, 136, 137, 138, 139). In FIG. 2, the information displayed at each branch of the tree comprises an icon, such as the icon labeled 132, and a label, such as the label "DBX1." Herein, information displayed in a branch of a tree, such as the combination of the icon 132 and the label DBX1, (which together are designated 151) is referred to as an "object." Conventionally, objects which are one level in the tree representation below a first object and directly below that first object are referred to as the "children" or "child objects" of the first object. Thus, for example, in FIG. 2 objects 161 and 162 are child objects of object 151. Similarly, objects 163, 164, 165, 166 are child objects of object 153.

As will be appreciated by those of skill in the art, one way that a user of a tree navigator graphical user interface often requests that data be loaded is by "expanding" a branch of the tree representation. Referring again to FIG. 2, note that various branches in the tree representation include a control button. In the example of FIG. 2, these control buttons 171, 172, 173, 174, 175 comprise a box with either a "+" or "−" sign contained therein. These control buttons, which are well known in the art, are referred to as "expand" (the "+" control button) or "collapse" (the "−" control button) control buttons which allow the user to either display or hide the information contained on lower branches of the tree. Thus, for example, if the user selects (typically using a pointing device) the collapse control button 174, objects 163, 164, 165, 166 are hidden in the tree representation 130, and the control button 174 is replaced with an expand control button (which indicates to the user that additional, undisplayed branches exist below the branch containing object 153).

Referring now to the branch in tree representation 130 containing object 162, it is seen (from expand control button 173) that additional lower branches (which are not displayed) exist. Typically, if these branches have never been displayed during the user's current session using the tree navigator graphical user interface (or if the tree navigator graphical user interface unloads objects when they are hidden), then the objects and any associated data corresponding to these hidden branches of the tree will not currently be loaded in the tree navigator graphical user interface. Thus, when the user selects expand control button 173, this selection generates a request to load data associated with the child objects of object 162 (which are not depicted in FIG. 2). In response to this request, each of the child objects are loaded into the tree navigator graphical user interface, along with any associated data which is programmed to be loaded along with each object.

Another way in which a user of a tree navigator graphical user interface can request that data be loaded is by "selecting" an object in the tree view display. Thus, for instance, in FIG. 1, the object labeled "Checkwin" has been selected, and as a result of this selection, the associated data displayed in the right hand window of FIG. 1 was loaded into the tree navigator graphical user interface for display. Those of skill in the art will appreciate that numerous other methods exist by which a user can request that data be loaded into a tree navigator graphical user interface, such as, for example, via commands entered through pull down menus, dialog boxes, or control panels. Accordingly, the methods of the present invention should be viewed as being independent of how the requests to load data are initiated, as they instead focus on preferred ways of implementing such a request.

In many instances, the objects displayed in a tree representation will have additional data associated with them. For instance, with reference to the tree navigator graphical user interface of FIG. 1, the object with the label "Checkwin" has been "selected" by the user, and as a result of this selection, various data associated with that object (namely a listing of the files contained in directory Checkwin) has been displayed in the data display window on the right hand side of FIG. 1. This data which is displayed in the data display may include other objects (such as sub-directories) and other data which does not comprise an object. It will also be appreciated that there may be additional data associated with the object which is not displayed, or which is only displayed if specifically requested by the user. Pursuant to the teachings of the present invention, it will be appreciated that when a user initiates a request to load data into a tree navigator graphical user interface, all the data associated with that object may be loaded at the same time. Alternatively, less data may be loaded (e.g., only information relating to the subdirectories and no information relating to files), or even none of the associated data, such that the only information loaded is the information displayed in the tree representation.

The use of tree representations to display hierarchical data is particularly useful in a number of computer applications. Custom coded tree navigator graphical user interfaces as well as tree navigator "objects" for providing such tree representations, are known in the art. A tree navigator object refers to a system or, more typically, a computer program product which is designed to interface with other software programs in a manner similar to a program subroutine, and which is capable of displaying data or information in a tree representation. Custom-coded tree navigator graphical user interfaces refer to software applications which include custom program code that displays data in a tree representation. Typically, both tree navigator objects and custom-coded tree navigator graphical user interfaces provide the user with at least some capability for manipulating the data in the tree representation or modifying how the data is displayed.

As noted above, the tree navigator graphical user interfaces of the present invention allow users thereof to more quickly and efficiently access and manipulate the hierarchical data displayed in the interface, by asynchronously processing requests for data and other commands, and by anticipating future requests for data based on previous requests made by the user. Moreover, these tree navigator graphical user interfaces further provide the user status information, including information as to the loading state (fully loaded, partially loaded) of objects in the tree view display and information as to when the loading of a particular data set is completed.

Figure 3:
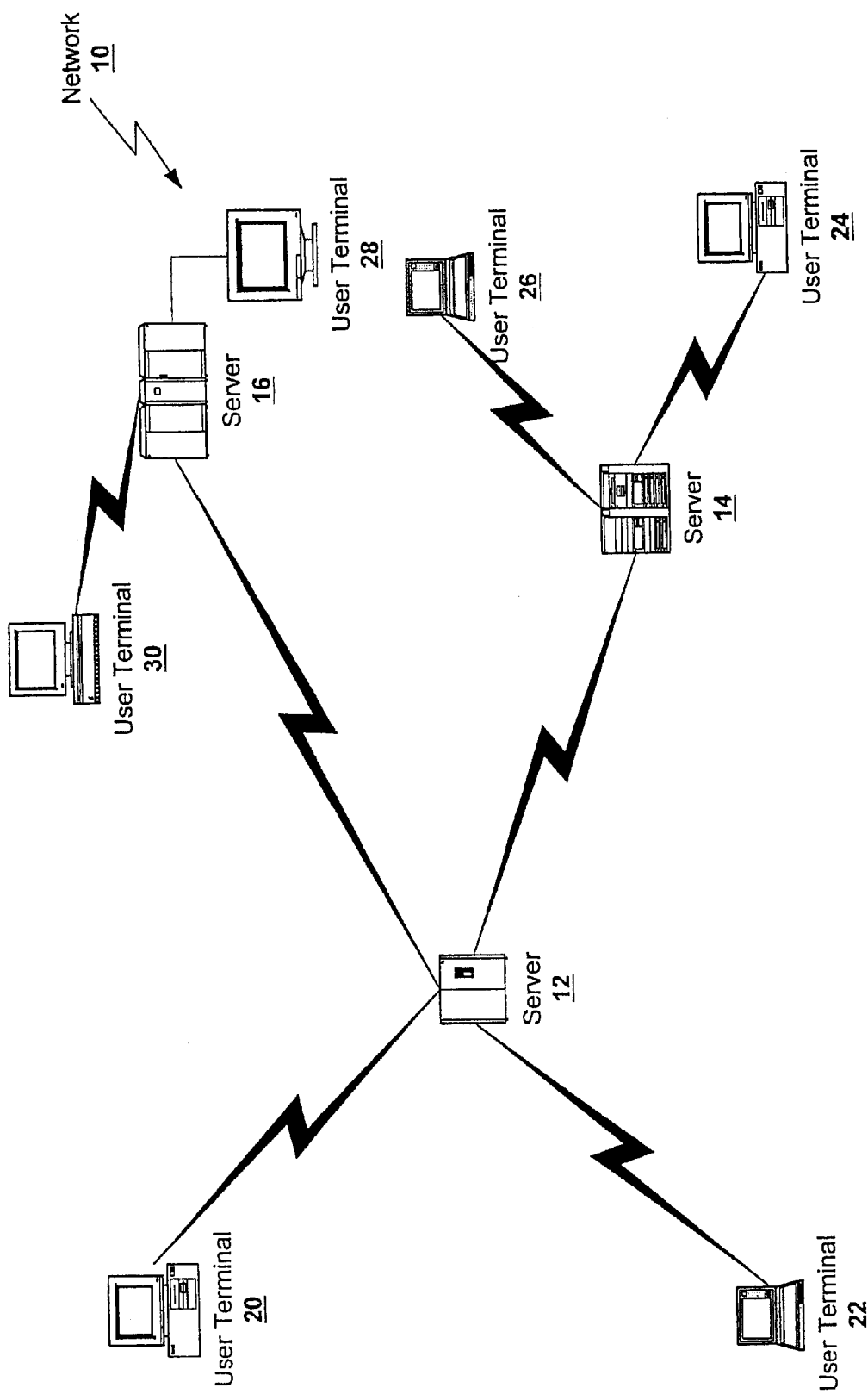
FIG. 3 is a diagram depicting a computer network in which the tree navigator graphical user interfaces of the present invention may be used.

The present invention may be particularly advantageous in situations where the tree navigator graphical user interface is used to access a hierarchical data set that is stored on a distributed, geographically dispersed network. FIG. 3 depicts such a communications network 10. As shown in FIG. 3, the network may include a plurality of servers, which are designated as 12, 14, 16, which are interconnected by communications links (which are represented by lightning bolt connections). These servers are typically used to store a wide variety of data and application programs, and also may serve as access points for various user terminals, which are designated 20, 22, 24, 26, 28, 30 in FIG. 3. As will be understood by those of skill in the art, the hierarchical data which is displayed in a tree navigator graphical user interface may be stored at one or more of the various servers 12, 14, 16, user terminals 20, 22, 24, 26, 28, 30 or other devices (not pictured) in the network 10.

In situations where a user using, for example, user terminal 30, is accessing hierarchical data that is stored at a "back-end" data store (i.e., a data storage device at a terminal or server which is remote from the user terminal 30, such as the server 12) via a tree navigator graphical user interface, the responsiveness of the interface to commands from the user will be a function of (among other things) the speed of the network connection between the server 12 and the user terminal 30. As many network connections operate at relatively low transmission rates, requests sent from the user terminal 30 to the server 12 to load a portion of the hierarchical data into the tree navigator graphical user interface at user terminal 30 may result in a delay of seconds, minutes or more, depending upon the amount of data to be loaded and the effective transmission rate of the network connection. Pursuant to the teachings of the present invention, queries for data from such back-end data stores may be processed "asynchronously" so that the tree navigator graphical user interface is available to execute additional commands while processing the request to load data from the back-end data store. Such asynchronous processing (which is discussed in more detail herein) is to be contrasted with the "synchronous" processing used in prior art tree navigator graphical user interfaces, where upon receiving the command to load data from the user, the tree navigator graphical user interface "locks-up" (e.g., displays an hourglass cursor and becomes unavailable to receive or process any additional commands from the user) until all the requested data is loaded.

Figure 4:
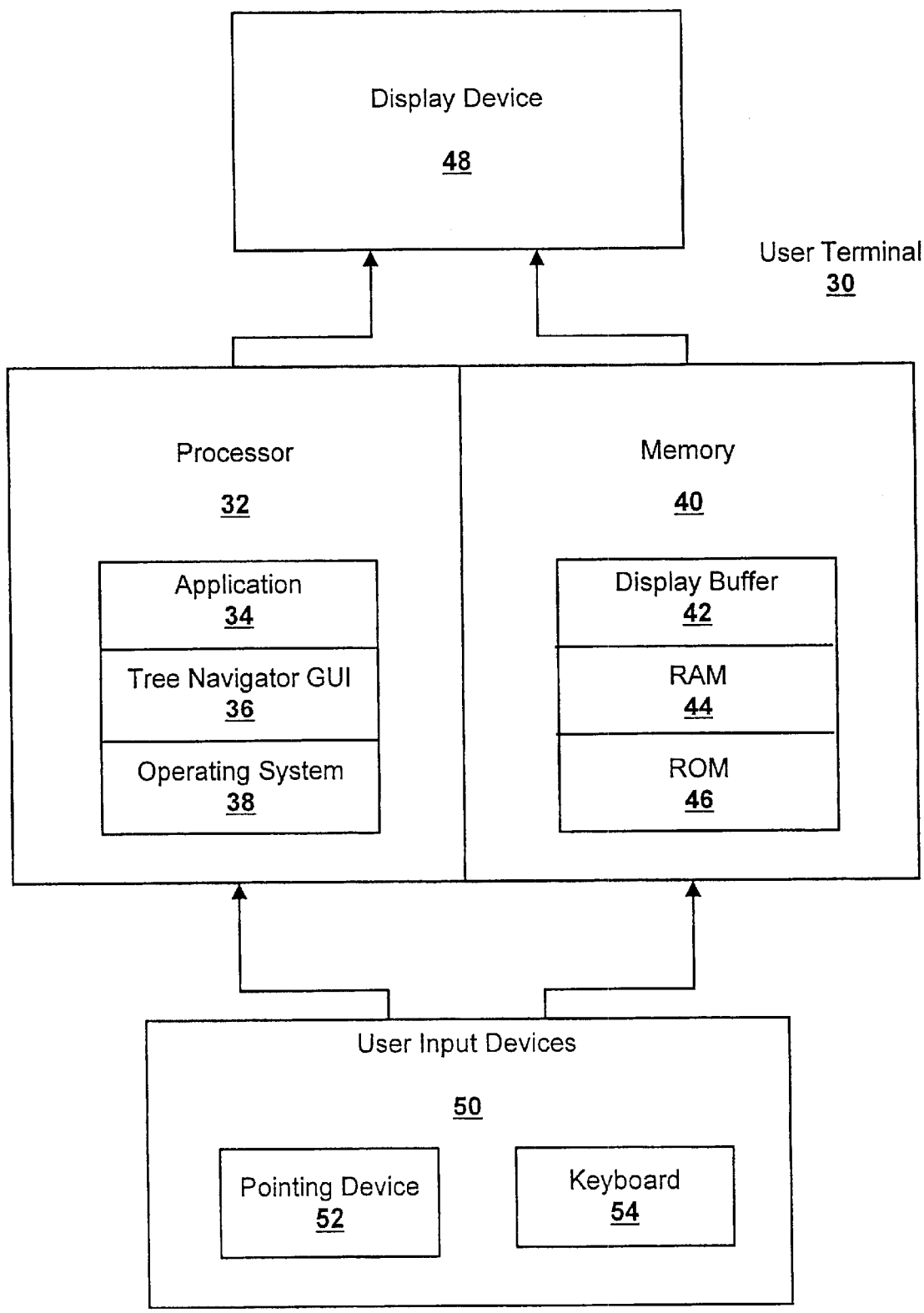
FIG. 4 is a block diagram depicting a user terminal on which the tree navigator graphical user interfaces of the present invention may operate.

FIG. 4 illustrates a data processing system on which tree navigator graphical user interfaces according to the present invention may be utilized. As seen in FIG. 4, a user terminal 30 may have a processor 32 and a memory 40. A number of application programs may run on the processor 32—in FIG. 4 these applications are designated 34, 36, 38 and include an operating system 38 and a tree navigator graphical user interface 36. In FIG. 4, the memory 40 includes random access memory ("RAM") 44, read only memory ("ROM") 46 and a display buffer 42. In a preferred embodiment of the present invention, data which is loaded "into" the tree navigator graphical user interface 36 is stored in display buffer 42, which may be implemented, for example, in a cache memory, virtual memory or conventional memory. Preferably, this display buffer memory 42 has a relatively fast access time, so that data contained in display buffer 42 may be displayed on the display device 48 with at most minimal delay. The user terminal 30 displays information on a display device 48. Typically, the display device 48 has a plurality of picture elements (collectively referred to as a screen) which may define the appearance of a user interface environment displayed on the display device 48. The contents of the display device 48 and, therefore, the appearance of the user interface environment, may be controlled or altered by the applications 34, 36 or the operating system 38, either individually or in combination. For obtaining input from a user, the operating system 38, the applications 34, 36, or both may utilize user-input devices 50. The user input devices 50 may include a pointing device 52 and a keyboard 54 and/or other peripheral input devices known to those of skill in the art such as, for example, a microphone. The user input devices 50 may be used to designate areas of the screen or locations on the screen such as the border of a workspace or an object in a tree view display.

Figure 5:
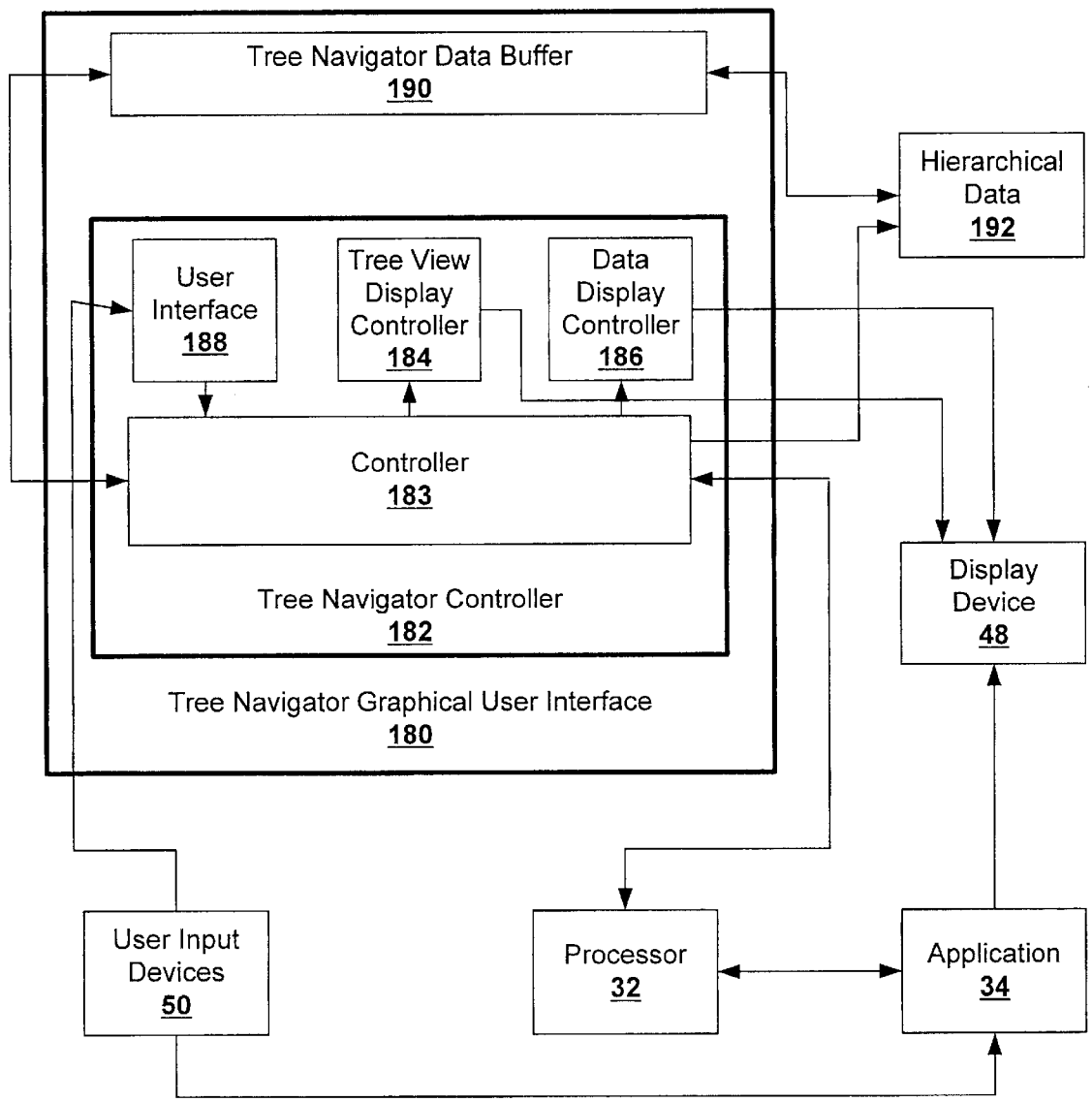
FIG. 5 is a block diagram depicting one implementation of a tree navigator graphical user interface according to the teachings of the present invention.

FIG. 5 is a block diagram illustrating an exemplary implementation of the present invention. As illustrated in FIG. 5, a tree navigator graphical user interface 180 is provided that comprises a tree navigator controller 182 and a tree navigator data buffer 190. The tree navigator controller includes a controller 183, a tree view display controller 184, a data display controller 186 and a user interface 188. As indicated in FIG. 5, the user of the tree navigator graphical user interface 180 accesses the user interface through one or more user input devices 50, such as a pointing device or a keyboard. These commands are received at the user interface 188 and sent to the controller 183. In a preferred embodiment of the present invention, both the user interface 188 and the controller 183 are implemented as a software application. Thus, the controller 183 may be operably associated with the processor 32, which is typically, but not always, resident on the user terminal 30 to which user input devices 50 are connected. The processor 32 may be used to process user commands such as commands to load data, commands to navigate the display, commands to add, edit, move or delete data that are entered by the user via the user input devices 50. The controller 183 also interfaces with a tree view display controller 184 and a data display controller 186, which are used to control how the tree view display and an associated data display (such as the display depicted on the right hand side of FIG. 1) is displayed on the display device 48. Both tree view display controller 184 and data display controller 186 may also be implemented in software that runs on processor 32. Those of skill in the art will appreciate that many tree navigator graphical user interfaces do not include an associated data display, and that separate display controllers such as controllers 184, 186 are not required, as their functions may be performed by controller 183.

As shown in FIG. 5, the controller 183 in many instances will also be operably associated with a tree navigator data buffer 190. Buffer 190 has access to the hierarchical data set 192, such as, for instance via network communications connections over which portions of the hierarchical data set 192 could be loaded into tree navigator data buffer 190. As shown in FIG. 5, the controller 183 typically controls transfers of data between hierarchical data set 192 and tree navigator data buffer 190.

The tree navigator data buffer 190 is typically implemented in memory 40 on the user terminal that is being used by the user, and may be used to store data which the user has had loaded. Typically, the buffer 190 will include the data which is displayed on display device 48, as well as additional data which the user has loaded, but which is not currently displayed. For instance, when the user loads a large set of data, not all the data will typically fit on the display device 48. In this instance, it is advantageous to store that data in a buffer which has quick access times so that if the user scrolls up or down to view data which was not previously displayed the new data which is displayed as a result of the scrolling operation can very quickly be displayed on the display device 48. Similarly, in tree navigator graphical user interfaces that include both a tree view display and a data display, typically the information which is displayed in the data display is the data that is associated with a particular branch (that the user has selected) of the tree representation depicted in the tree view display. However, if the user has loaded data corresponding to other branches of the tree, it may be advantageous to keep this data stored in tree navigator data buffer 190, because if the user selects one of these other branches, the associated data can typically be more quickly displayed if it is stored in the buffer 190.

Those of skill in the art will appreciate that the buffer 190 can be implemented in many different ways, such as in the cache memory, RAM, or the hard drive of the user terminal on which the tree navigator graphical user interface 180 is present. Preferably, the buffer 190 has an access time which is less (and preferably many orders of magnitude less) than the access time required to retrieve the data from its normal storage location. (Note that the access time to retrieve data from its regular storage location may be large because the data is located in a remote location over a limited-bandwidth network connection, or for any of a wide variety of other reasons, such as the data is stored in a data base which requires computationally intensive operations to access.) Thus, if the tree viewer graphical user interface 180 is resident on the same user terminal as is the hierarchical data 192 (and the user is directly accessing this computer), typically the hierarchical data is stored on some sort of relatively slow storage device, such as a hard disk, a floppy disk or a compact disk, and the tree navigator data buffer 190 is implemented in a relatively fast memory device, such as random access or cache memory. However, when the hierarchical data 192 is stored on a back-end network device, in many instances the access time to a hard drive will be much quicker than the access time to the back-end storage device. Accordingly, in such an instance, tree navigator data buffer 190 could be implemented partially or fully in a hard disk or other relatively slow memory device, because the access time to such a device could still be significantly faster than the time required to access the information from the back-end storage device.

As is also shown in FIG. 5, the tree view display controller 184 and the data display controller 186 are connected to the display device 48. Through these connections, the tree navigator graphical user interface displays data in response to user inputs. Typically, the display device 40 may also be used to display data associated with other applications, such as the application 34, resident on the user terminal 30. These other applications also typically use the processor 32 included on the user terminal 30.

The present invention will now be further described with respect to FIGS. 6–9, which are a series of flowcharts illustrating various methods for loading data into a tree navigator graphical user interface. It will be understood that each block in the flowcharts (and/or the blocks in the preceding block diagrams) and combinations of blocks in the flowcharts and/or block diagrams, can be implemented by computer program instructions. These program instructions may be provided to a processor such that the instructions which execute on the processor create means for implementing the functions specified in the flowchart and/or block diagrams block or blocks. The computer program instructions may be executed by a processor to cause a series of operational steps to be performed by the processor to produce a computer implemented process such that the instructions which execute on the processor provide steps for implementing the functions specified in the flowchart and/or block diagrams block or blocks.

Accordingly, blocks of the flowchart and/or block diagram illustrations support combinations of means for performing the specified functions, combinations of steps for performing the specified functions and program instruction means for performing the specified functions. It will also be understood that each block of the flowchart and/or block diagram illustrations, and combinations of blocks in the flowchart and/or block diagram illustrations, can be implemented by special purpose hardware-based systems which perform the specified functions or steps, or combinations of special purpose hardware and computer instructions.

Figure 6:
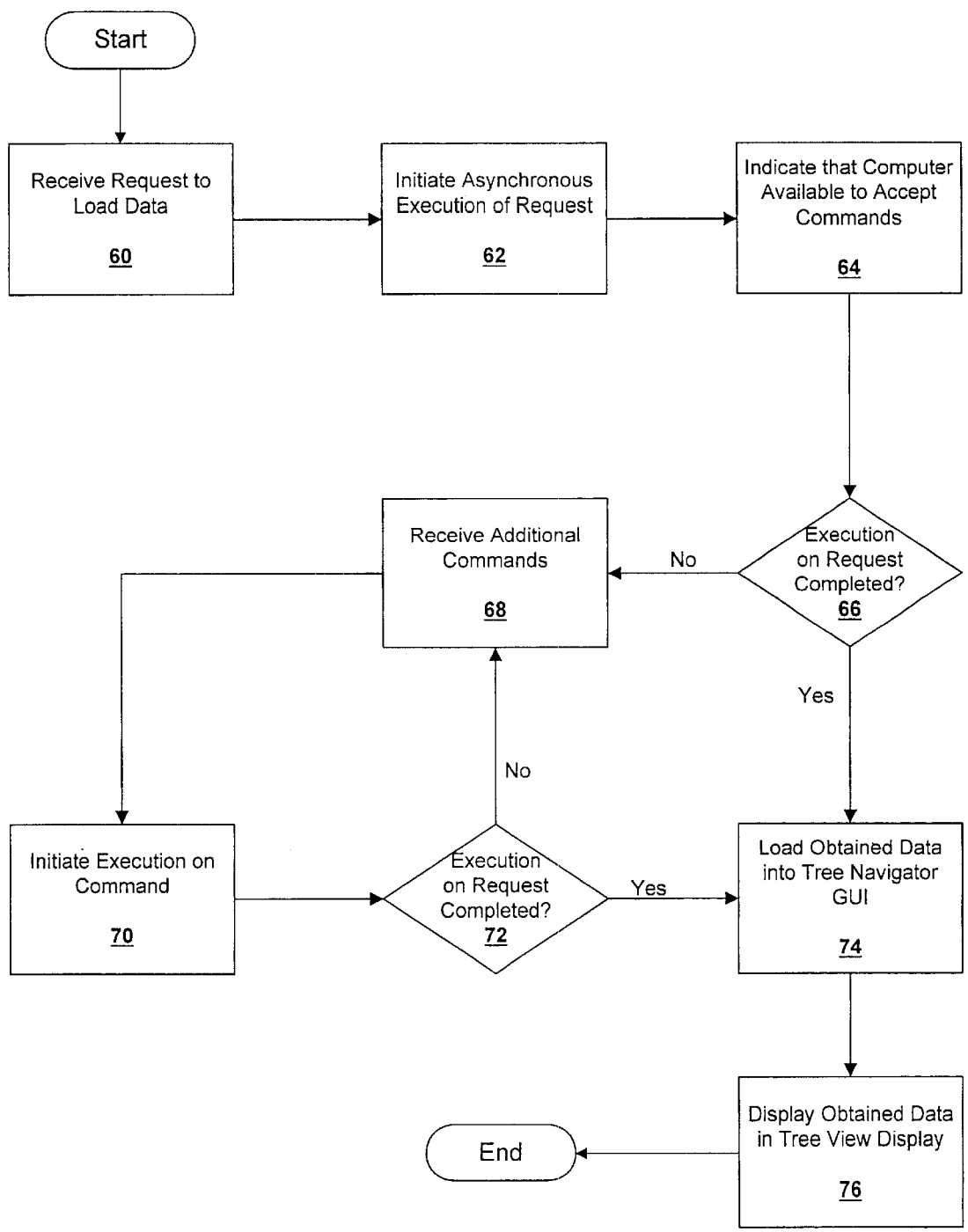
FIG. 6 is a flow chart illustrating an aspect of the present invention in which the tree navigator graphical user interface asynchronously processes requests to load data.

As noted above, pursuant to one aspect of the present invention, the tree navigator graphical user interface executes on requests to load data asynchronously. The flow chart of FIG. 6 illustrates such a method of operation in more detail. As shown in FIG. 6, the method starts when the tree navigator graphical user interface receives a request to load data (block 60). By a request to load data it is meant that the user, the tree navigator graphical user interface, or some other application, device, or operator has commanded the tree navigator graphical user interface to load certain data for potential use in the tree navigator graphical user interface from a data set remote from (or computationally time-consuming to obtain) the tree navigator graphical user interface (although perhaps resident on the same user terminal). In response to such a request, the requested data is ultimately loaded into memory, buffers or other storage medium which is immediately accessible by the tree navigator graphical user interface, such as the tree navigator data buffer 190 depicted in FIG. 5. In response to this request, the tree navigator graphical user interface starts to execute on, or respond to, the request using asynchronous processing techniques (block 62). By "asynchronous" processing it is meant that the tree navigator graphical user interface will simultaneously execute on multiple user-generated commands, by, for instance, using parallel processing techniques. Thus, since asynchronous processing is used, once execution of the request to load data is initiated, the tree navigator graphical user interface becomes available to receive and execute on additional commands, even though the tree navigator graphical user interface may not have finished processing the request to load data received in block 60 of FIG. 6. Such asynchronous processing is to be distinguished from the "synchronous" processing described above used by prior art tree navigator graphical user interface.

As shown in FIG. 6, preferably the tree navigator graphical user interface notifies the user that the computer is available to accept commands pending the processing of the request to load data (block 64). Such notification may be provided in a wide variety of ways known to those of skill in the art. In one embodiment of the present invention, the notification of block 64 may be provided by having the pointing device remain an arrow after execution of the request to load data is initiated. In another embodiment, the pointing device is replaced by an hourglass icon which includes an arrow pending completion of execution on the request to load data, which is a convenient method (that is known in the art with respect to other applications) for notifying the user that the request to load data is being processed and that the computer remains available to accept additional commands.

As indicated by block 66 of FIG. 6, the tree navigator graphical user interface may finish executing on the request to load data (i.e., it obtains the requested data) before any subsequent commands are received. If this occurs, the data obtained in response to the request to load data may be loaded into the tree navigator graphical user interface (block 74). Typically the data is loaded into a buffer of some sort such as tree navigator data buffer 190 depicted in FIG. 5.

Typically, some portion of this obtained data is then displayed (block 76) on display device 48, so long as the user is displaying a portion of the tree representation which includes the requested data.

If, however, a user-generated command (i.e., another request to load data, a scrolling of one of the display windows, an edit of data contained in a display window, etc.) is received before the processor finishes executing on the request to load data (block 68), the processor initiates execution on this command (block 70). In the embodiment of the present invention depicted in FIG. 6, execution on this subsequent command is performed asynchronously, particularly if the subsequent command comprises a second request to load data. However, it will be appreciated that in some applications it may be preferred to execute on certain types of commands synchronously (i.e., preventing execution of new commands pending the completion of the processing of the command that is processed synchronously). In any event, the processor may continue to receive and execute additional commands so long as the request to load data is being processed (blocks 68, 70, 72). As noted above, when the processor completes execution on the request to load data of block 62, the data obtained in response to that request is loaded into the tree navigator graphical user interface (block 74), and thereafter, some portion of that data is typically displayed in the tree view display (block 76).

As noted above, prior art tree navigator graphical user interfaces typically would process (execute on) user-generated commands one at a time. Thus for instance, when a user generates a request to load data in Microsoft Windows Explorer NT (by, for example, expanding a branch in the tree diagram on the left hand side of FIG. 1 by clicking on one of the expand control buttons), the pointing device turns to an hourglass and the user is prevented from entering any additional commands to manipulate the tree navigator graphical user interface until execution on the request to load data is completed. In direct contrast to these prior art tree navigator graphical user interfaces, the methods and systems of the present invention execute on user-generated requests for data asynchronously, and thus once processing is initiated on the request to load data, the graphical user interface is ready to accept and initiate processing on additional commands. In this manner the user can continue to view data and navigate the tree view display while awaiting a response to the request to load data.

Pursuant to another aspect of the present invention, methods, systems and computer program products are provided which may immediately provide a user of the tree navigator graphical user interface access to data received in response to a request to load data, even if additional responsive data has not yet been obtained. In this manner, the user of the graphical user interface has the perception that the graphical user interface is responsive to his or her commands (as some data is provided faster than it otherwise would be), and the user is also able to use the "partial data" that is made available earlier, which may result in a more efficient graphical user interface.

Figure 7:
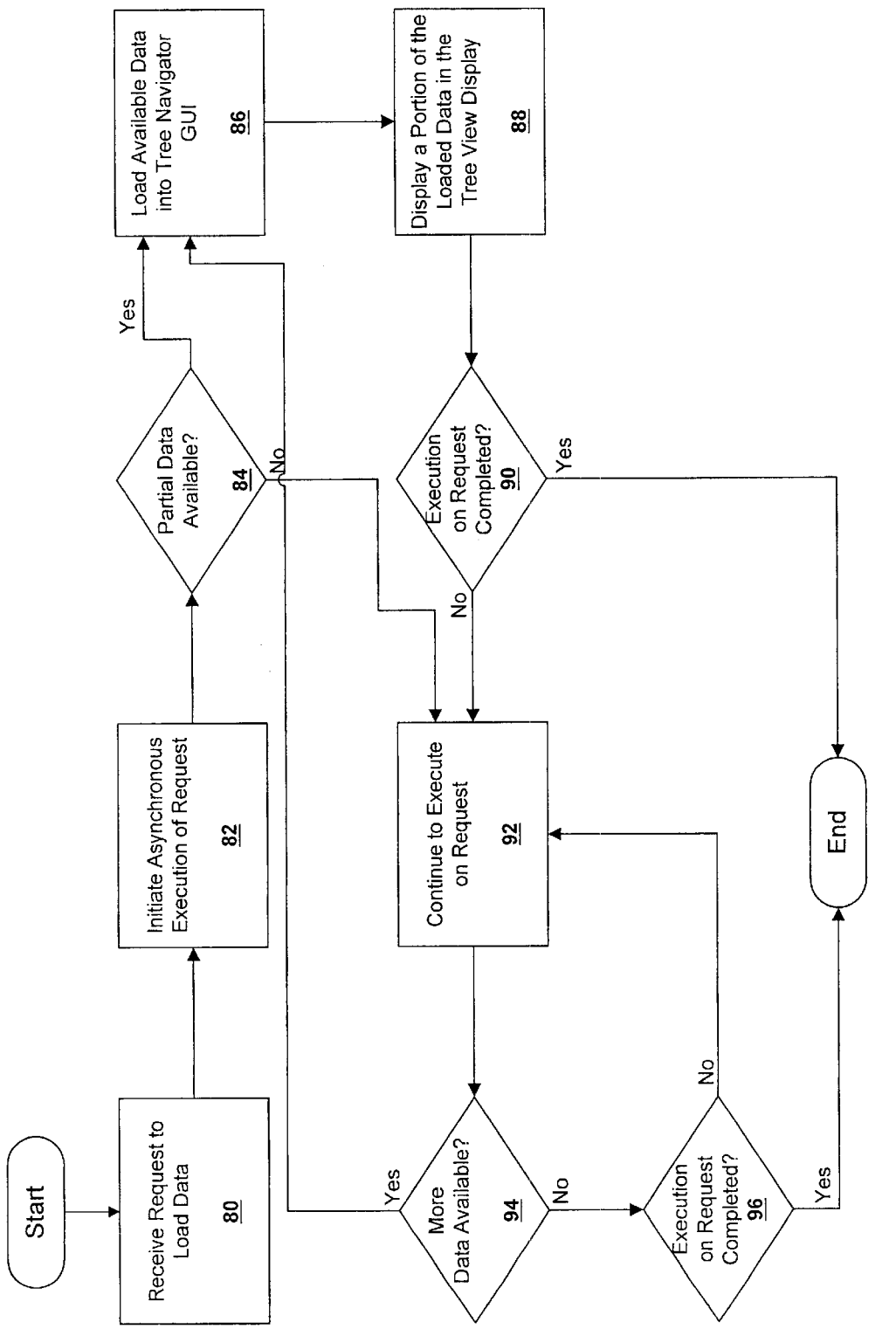
FIG. 7 is a flow chart illustrating an aspect of the present invention in which the tree navigator graphical user interface displays partial information as soon as it is available.

The flow chart of FIG. 7 depicts an embodiment of one of the methods of the present invention that provides such access to partial data. As indicated in FIG. 7, upon receiving a request to load data (block 80), the tree navigator initiates asynchronous execution on the request (block 82). Sometime after execution on the request to load data is initiated, data may become available at the tree navigator which is responsive to the request (block 84). However, if the amount of data requested is large, or if it the requested data is stored in multiple remote locations, typically all the data responsive to the request will not become available at the same time. As shown in FIG. 7, in this case the tree navigator graphical user interfaces of the present invention may load the data that is available (block 86), and then, depending upon what data the user has requested be displayed, may display all or a portion of this partial data on the display device 48 (block 88).

As is also shown in FIG. 7, if partial data is not initially available (block 84), the tree navigator graphical user interface continues to execute on the request to load data (block 92). (Note that in many instances, this simply means that the tree navigator graphical user interface continues to wait for data to be delivered from a back end storage device). Similarly, execution of the request also continues even if partial data was available and has been displayed, so long as additional responsive data has yet to be loaded (blocks 90, 92). If additional data is received at the tree navigator graphical user interface (block 94), it is loaded into the tree navigator graphical user interface (block 86), and displayed on the display device 48 to the extent the user has requested that the data be displayed (block 88). As shown in FIG. 7, this process continues until all the responsive data has been received and loaded into the tree navigator graphical user interface.

Figure 8:
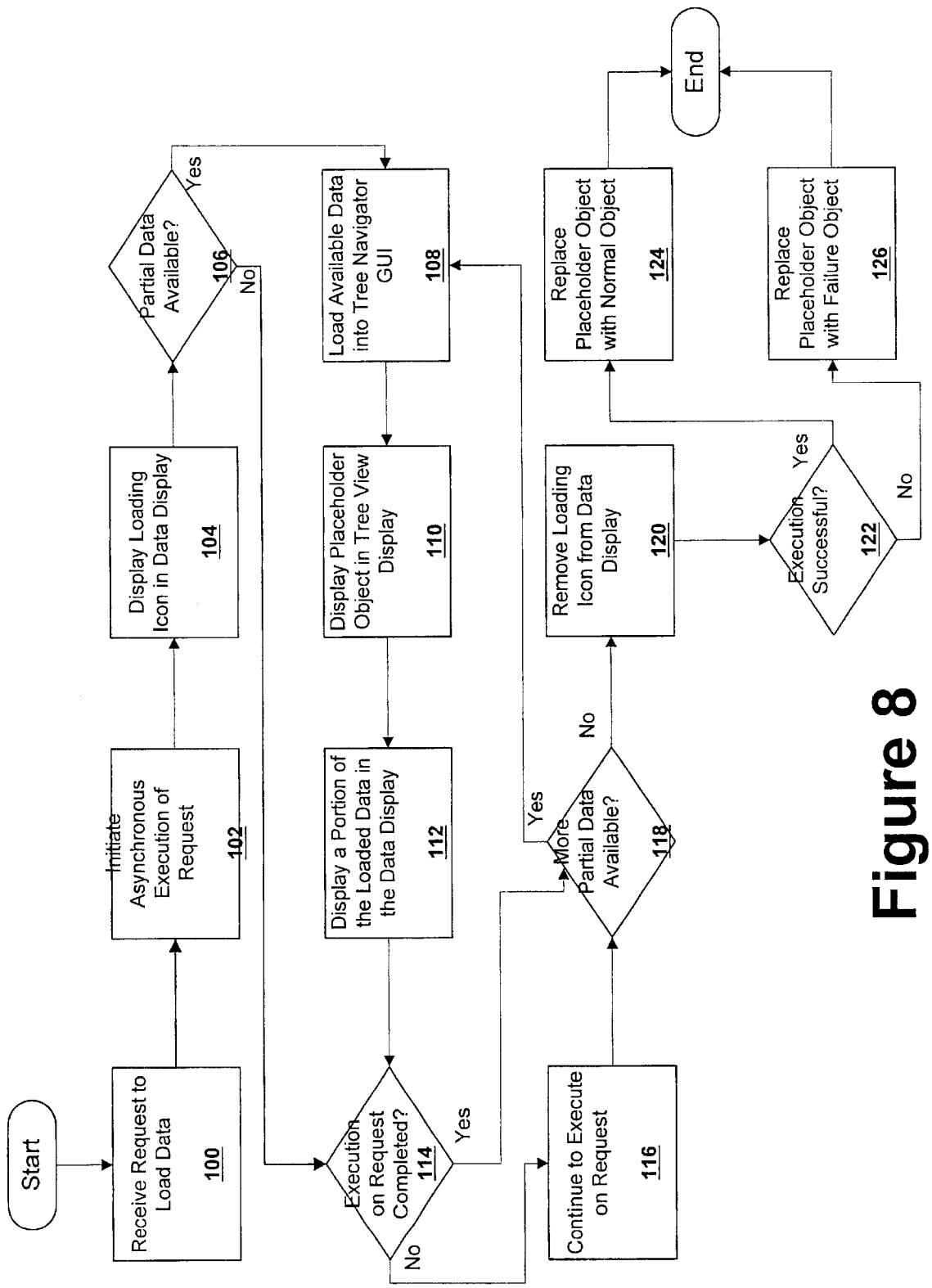
FIG. 8 is a flow chart illustrating an aspect of the present invention in which the tree navigator graphical user interface uses placeholder objects and/or loading indicia to provide status information.

In yet another aspect of the present invention, the tree navigator graphical user interfaces provide the user information regarding the status (e.g., fully loaded, in the process of loading or failed to load) of objects displayed in the tree view display. The flow chart of FIG. 8 illustrates one embodiment of this aspect of the present invention. As shown in FIG. 8, after receiving a request to load data (block 100), the tree navigator graphical user interface initiates execution on the request (block 102). As discussed previously, pursuant to another aspect of the present invention, it is preferred that this execution be performed asynchronously. As shown in FIG. 8, if the tree navigator graphical user interface includes a data display (i.e., a display area for displaying data associated with the objects displayed in the tree view display), a loading icon may be displayed within this display during some or all of the time the tree navigator graphical user interface is executing on the request to load data. Such a loading icon can be any indicia that notifies the user that the tree navigator is in the process of loading data, such as an hourglass or a box which includes the word "loading."

Once partial data is received in response to the request to load data (block 106), the data which is available may be loaded into the tree navigator graphical user interface (block 108). Thereafter, a placeholder object may be displayed in the tree view display (block 110). As used herein, the term "placeholder object" refers to an object which is configured differently from the normal representation of the object (an object displayed in its normal or customary representation is referred to herein as a "normal" object) so as to provide the user information regarding the loading status of the object. As discussed above, the tree navigator graphical user interface may be implemented so that each time an object is loaded into the tree view display, certain additional information (which may or may not be displayed) is loaded into the tree navigator graphical user interface. For instance, when a particular object is loaded into the tree navigator graphical user interface and displayed in the tree view display, some or all of the data associated with that object which would be displayed in a data display that is associated with the tree view display may also be loaded automatically along with the object. As soon as the data comprising the object is loaded into the tree navigator graphical user interface, it is displayed in the tree view display in a placeholder object. This notifies the user that while some data has been loaded in response to the request to load data, certain additional data associated with the placeholder object has not yet been loaded.

In many tree view displays, each object comprises a label and a colored icon. For such a tree view display, a convenient way of implementing the "placeholder object," is to display the label and a "ghost" (i.e., black and white) representation of the icon. In this manner, the user can quickly determine from the tree view display whether or not the data associated with a particular object has been loaded into the graphical user interface by seeing if a "normal object" or placeholder object" is displayed in the tree view display.

As shown in block 112 of FIG. 8, the partial data which includes the data comprising the object may also include additional data which is to be displayed in the data display. Some or all of the partial data may also be displayed, as was discussed in more detail with respect to the flow chart of FIG. 7. As indicated in FIG. 8, the tree navigator graphical user interface continues to execute on the request until all the data responsive to the request has been obtained (blocks 114, 116). If more data is received in response to the request (block 118), it may be loaded into the tree navigator graphical user interface (block 108), and some or all of this additional data may be displayed in the data display (block 112). Preferably, the placeholder object is displayed as soon as sufficient data is available to create the placeholder object (i.e., the name of the label and the type of icon to display), and remains displayed on the display device until either the user scrolls the screen sufficiently far so that it disappears off the edge of the display device or until all the data responsive to the request to load data has been loaded. However, it will also be understood that depending upon the particular application it may be preferred to switch from a placeholder object back to a normal object before all the data responsive to the request is obtained.

Once all the data responsive to the request has been obtained and loaded into the tree navigator graphical user interface, the loading icon is removed from the data display (block 120). Then (in the example of FIG. 8), if the execution on the request was successful (i.e., all data responsive to the request was successfully obtained), the placeholder object is replaced with a normal object (block 124). If however, the execution was not successful, which would occur, for example, if the network connection to a server having responsive data had been severed, the placeholder object is replaced with a "failure object" which is a configuration of the object designed to indicate that the attempt to load the data associated with the object was unsuccessful. In a preferred embodiment of the present invention, a "failure object" comprises the label and icon of its associated normal object with an "X" superimposed over the icon.

While in the example of FIG. 8 the loading icon is displayed in the data display area, it will be appreciated that in some situations it may also be beneficial to display a loading icon in the tree view display. For instance, when the tree navigator graphical user interface is in the process of loading child objects in response to a command to expand a branch of the tree, a loading icon could be displayed in the tree view display prior to the time the first child object (be it a placeholder object or a normal object) is displayed in the tree view display. It will also be understood that such a loading icon may be located anywhere within either or both of the tree view display and/or data display areas. As should be clear from the above discussion, it is preferred that the tree navigator graphical user interface executes on commands asynchronously, and in this case the appearance of the loading icon does not prevent the user from entering additional commands.

As noted above, in one aspect of the present invention, data is automatically loaded in anticipation of future requests to load data. In a preferred embodiment of the present invention, such data would include the data comprising each of the child objects of the parent object (and its associated data) that is being loaded. In this manner, if the user later "expands" the parent object, placeholder objects for each of the child objects may be displayed immediately, since the data required to create these placeholder objects is already loaded into the tree navigator graphical user interface. This gives the user the perception of instant responsiveness, and advantageously provides the user access to partial information immediately (as the placeholder objects are partially functional, in that you can, for example, initiate a request to expand a placeholder object which will be processed in parallel with any outstanding commands or requests to load data). Thereafter, the tree navigator graphical user interface can load any additional data (after requesting it) that is to be loaded along with each of the child objects, and can confirm that the previously loaded child objects are still "good" data (i.e., that none of them have been deleted, or that additional child objects have not been added). Once the additional data is loaded for a particular child object, the placeholder object for that child object is replaced with the child object's normal object.

Moreover, note that in many situations the user may not be interested in the data in a child object, but instead is interested in moving further down the tree representation. If asynchronous processing of requests to load data is employed, in this situation the user can move down the tree (by expanding the child placeholder object of interest) as soon as the placeholder object for the child of interest is displayed. In this manner, the user can more quickly and efficiently navigate the tree diagram.

Those of skill in the art will appreciate that one type of request to load data is a request to "refresh" data that is already loaded. Such "refreshes" may be necessary in systems where other users can add to or otherwise modify the set of hierarchical data. Utilizing the present invention such refresh operations may be performed without eliminating the user's access to the already loaded, but possibly stale, data that is being refreshed. When the refresh query is completed the object is automatically updated to reflect the most recent information associated with the object. In a preferred embodiment of this aspect of the present invention, the object subject to the refresh operation is represented by a placeholder object during the pendency of the refresh operation, to indicate to the user that the refreshed data is in the process of being loaded.

Pursuant to another aspect of the present invention, the concept of loading and displaying partial data in the graphical user interface may be enhanced if the graphical user interface is programmed to anticipate future requests for data based on a user's prior requests for data. Based on such anticipation, the tree navigator graphical user interface may be programmed to internally initiate requests to load data, so that the data will be immediately available if, as anticipated, the user thereafter initiates such a request. Moreover, as the methods, systems and computer program products of the present invention may use asynchronous processing, the impact on the user of the delay which may result from loading this additional data will in many situations be reduced or eliminated.

Figure 1:
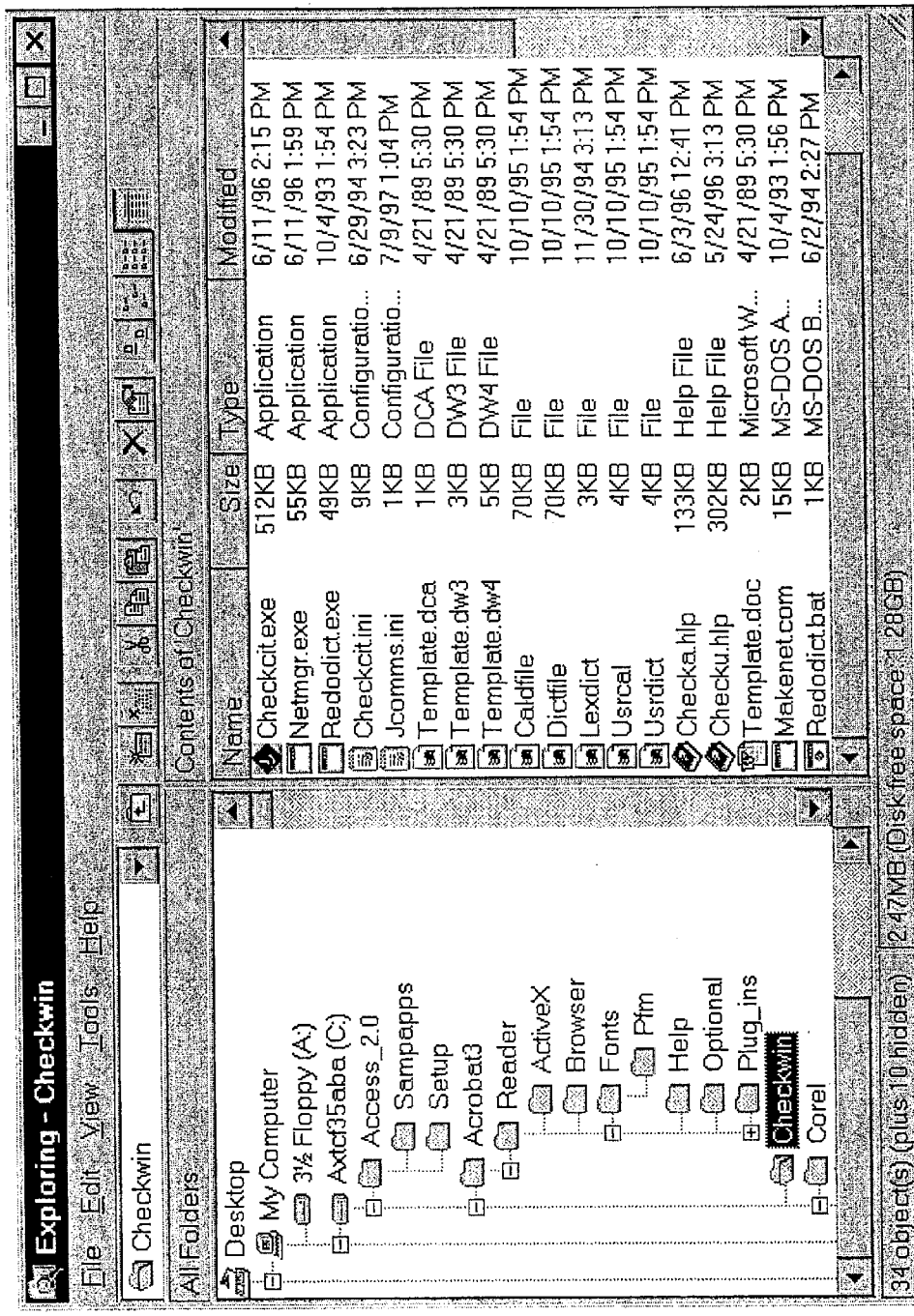
FIG. 1 is a screen capture of a prior art tree navigator graphical user interface.

By way of example, in both the prior art tree navigator graphical user interface of FIG. 1 and the tree navigator graphical user interface of FIGS. 10A–F (described herein), when the user expands a branch in the tree representation (i.e., selects the "plus" sign adjacent to the branch using the pointing device), a request to load the child objects of the object displayed in that branch is received at the tree navigator graphical user interface. As will be appreciated in light of the teachings of the present disclosure, in many instances there is a high probability that after expanding this particular branch the user will shortly thereafter request data associated with at least one of the child objects of the branch. In anticipation of such a request, the tree navigator graphical user interface of the present invention may initiate requests to load some or all of the data relating to the child objects when the parent object is requested or loaded. In this manner, the data may be available for display essentially immediately in the event the user initiates the anticipated request for this data.

Figure 9:
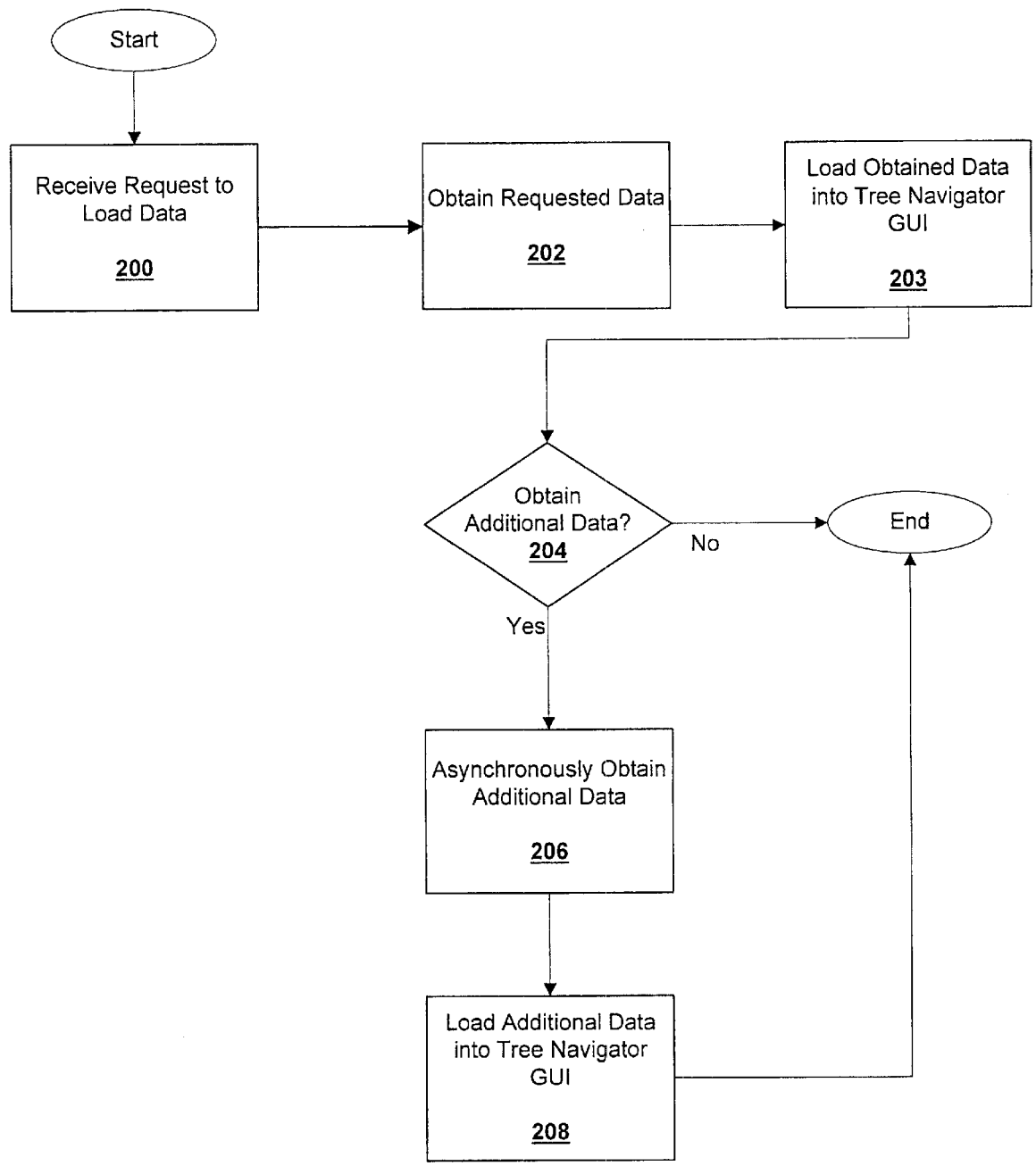
FIG. 9 is a flow chart illustrating pre-loading operations according to one embodiment of the present invention.

FIG. 9 is a flow chart displaying one embodiment of this aspect of the present invention. As shown in FIG. 9, upon receiving a request to load data (block 200), the tree navigator graphical user interface obtains data in response to the request (block 202) and loads it into the tree navigator graphical user interface (block 203). As discussed above, preferably this data is obtained by asynchronously executing on the request to load data. In this particular embodiment, the tree navigator graphical user interface waits until after the requested data has been obtained and loaded, and then determines if any additional data should also be obtained in anticipation of future requests to load data (block 204). This may be accomplished, for example, by a programmed software routine that automatically requests certain additional types of data when certain categories of data, or certain specific data, is requested. If no additional data need be obtained, the methodology is completed. However, if additional data should be obtained, the tree navigator graphical user interface acts to obtain this additional data (block 206), typically using asynchronous processing, and then loads this additional data into the tree navigator graphical user interface (block 208).

Exactly how much and what type of data is requested in anticipation of future requests to load data will vary depending upon a number of factors, including the type of hierarchical data, the storage capacities at the user terminal, the speed of network connections, etc. Thus, for instance, using the example of the Microsoft Windows Explorer tree navigator graphical user interface of FIG. 1, it will be appreciated that in some instances, it may be advantageous to load the data associated with each of the child objects of the branch that is expanded (i.e., the data that would be displayed in the data display on the right hand side of FIG. 1 if the child object is selected). In this manner, if the user selects one of the child objects, the data associated with this child object (i.e., the subdirectories and files stored in the child object) may be displayed almost immediately once requested by the user. In other instances, however, it may be advantageous to only pre-request the child objects (i.e., subdirectories) of each child object of the expanded branch. This more limited request is preferred if the user is likely to expand numerous branches and sub-branches before attempting to access a file.

Figure 10A:
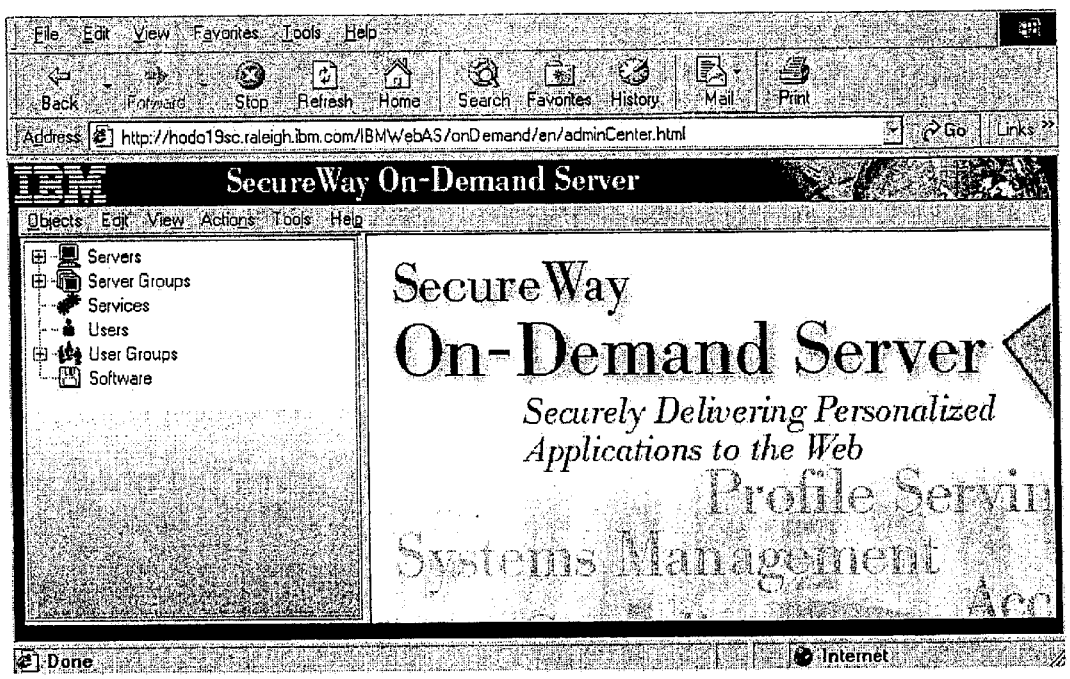
FIGS. 10A–F are screen captures of a tree navigator graphical user interface that incorporates the concepts of the present invention.

FIGS. 10A–10F are screen captures from an application program that includes a tree navigator graphical user interface according to the teachings of the present invention. In FIG. 10A, the tree view display portion of the graphical user interface is shown on the window on the left hand side of the figure. In this particular example, the highest or "root" level of the tree representation is not displayed, and only the level immediately below the root level (which includes six branches) is displayed. Three of the branches include expand control buttons, indicating that the objects contained in each of those branches have one or more child objects. In FIG. 10A, each of the objects are represented as a normal object, which, in this example, comprises a full color icon along with an associated label.

Figure 10B:
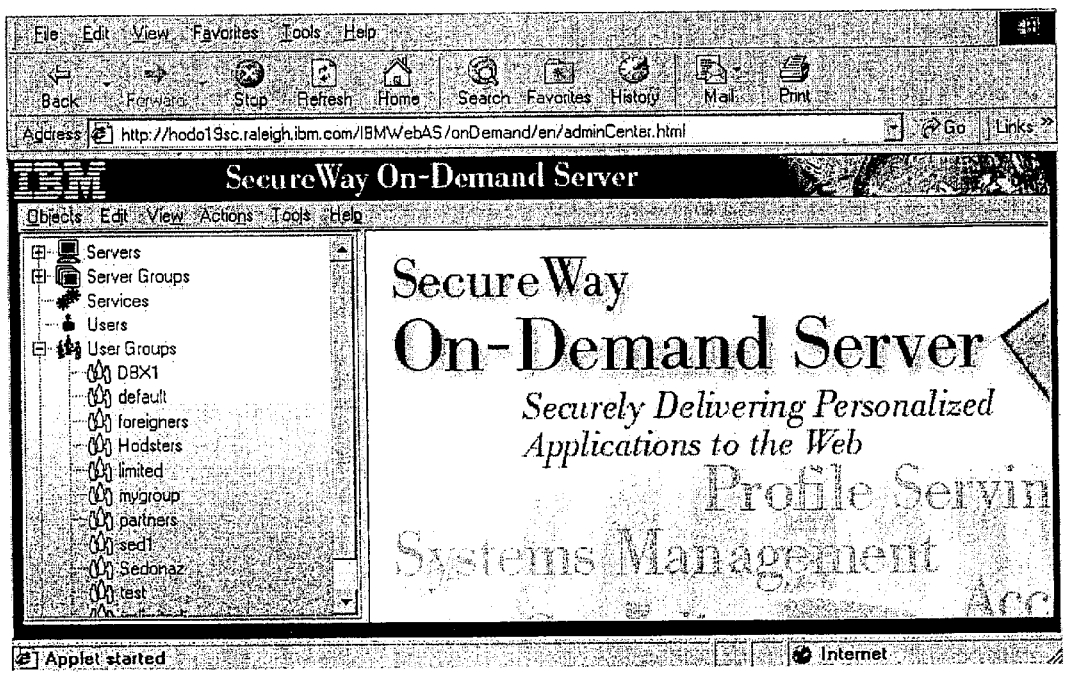

FIG. 10B shows how the screen capture of FIG. 10A is modified after the user selects the expand control button that is just to the left of the "User Groups" object. As shown in FIG. 10B, the expand control button changes to a collapse control button, and the child objects of the "User Groups" object are displayed. In this particular example, these child objects were displayed in the tree view display almost immediately, as information regarding these child objects was requested when the "User Groups" object was loaded in anticipation of a future query. Note that each of the child objects is displayed as a placeholder object (as indicated by the black and white or "ghost" icons). This indicates that additional data associated with each of these child objects is still in the process of being loaded into the tree navigator graphical user interface.

Figure 10C:
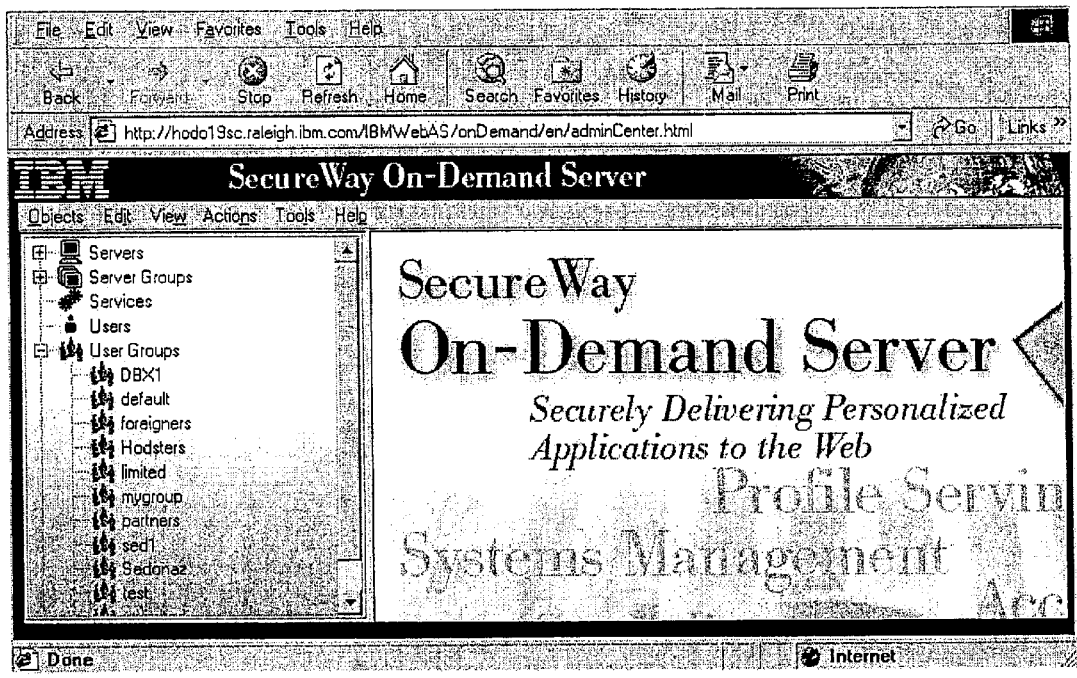

FIG. 10C illustrates how FIG. 10B changes after the information associated with each of the child objects has been loaded into the tree navigator graphical user interface. As can be seen in FIG. 10C, each of the placeholder objects has been replaced by the normal object for the respective child objects.

Figure 10D:
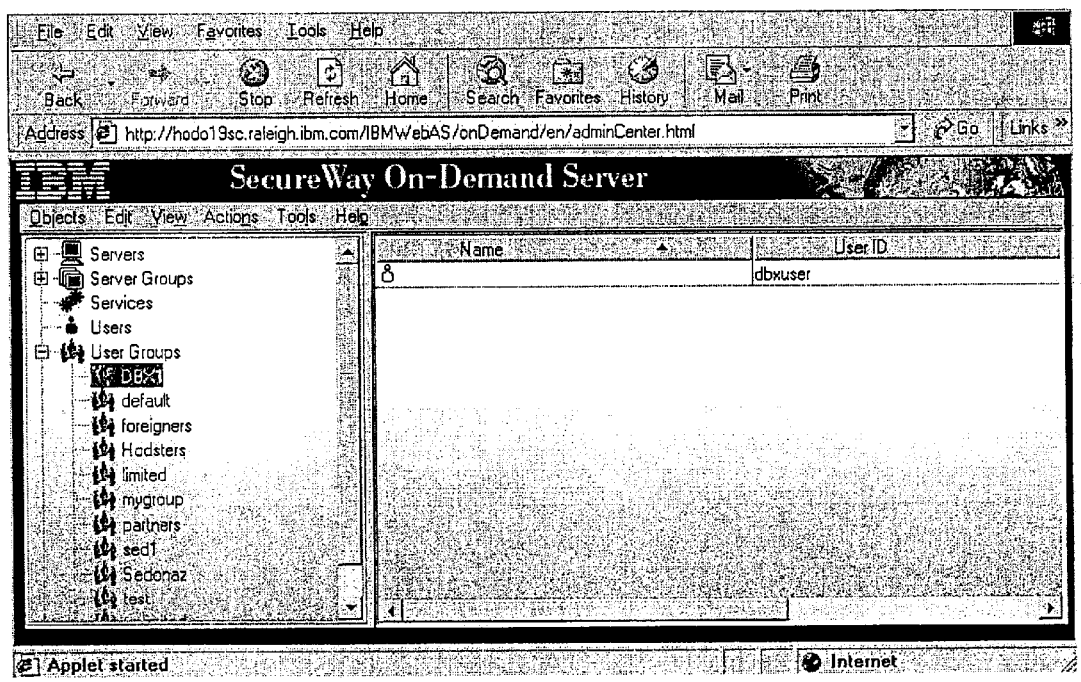
Figure 10E:
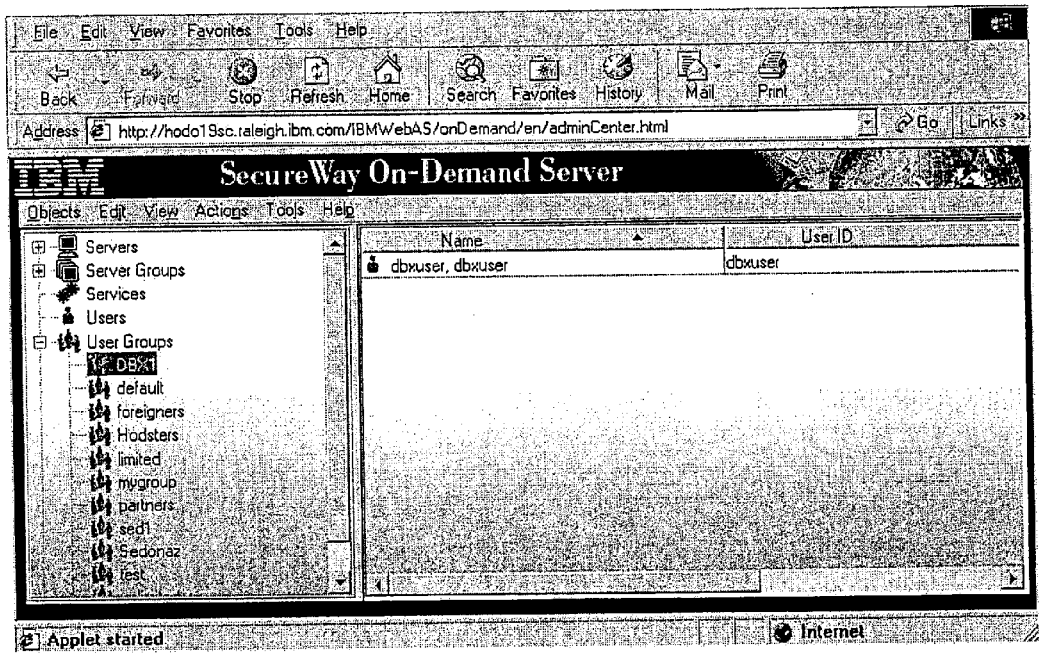

FIG. 10D depicts how FIG. 10C changes after the user has selected the "DBX1" object (e.g., by selecting it with the pointing device). As seen in the figure, a data display window is provided on the right hand side of the page that displays additional data associated with the "DBX1" object. In the data display in the "Name" column, only a placeholder object appears, indicating that the tree navigator graphical user interface is still in the process of loading this associated data. FIG. 10E illustrates how FIG. 10D changes once all the data requested by the user's selection of the "DBX1" object has been loaded into the tree navigator graphical user interface. In FIG. 10E, we see that this additional data comprised the name for the one user associated with the DBX1 user group. Note that in the data display a normal object has replaced the placeholder object (as all the requested data is now loaded).

Figure 10F:
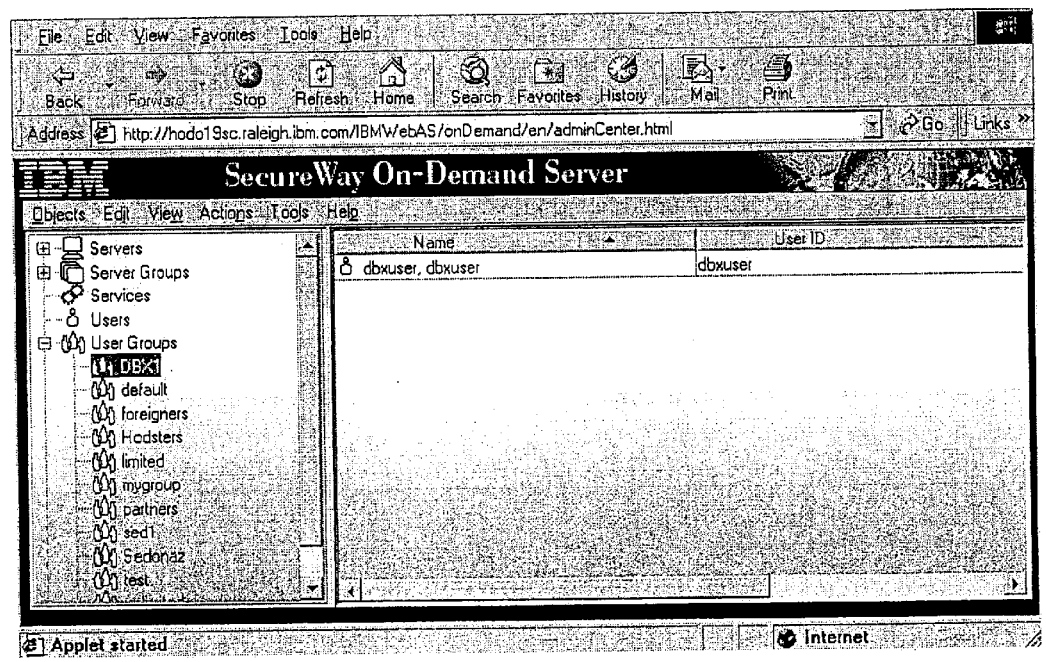

Finally, FIG. 10F illustrates how the display of FIG. 10A changes if the user "refreshes" all the data. As seen on the left hand side of FIG. 10F, each of the objects in the tree view display has been replaced with a placeholder object, indicating that the tree navigator graphical user interface is in the process of loading data associated with each object. The same is true for the one object depicted in the data display on the right hand side of the figure. Note, however, that the data that was previously loaded remains in the data display, and hence is available for the user to view and manipulate while awaiting the response to the refresh command.

In the drawings and specification, there have been disclosed typical referred embodiments of the invention and, although specific terms are employed, they are used in a generic and descriptive sense only and not for purposes of limitation, the scope of the invention being set forth in the following claims.

That which is claimed is:

1. A method of loading data that is part of a set of hierarchical data into a tree navigator graphical user interface which includes a tree view display, the method comprising the steps of:
   receiving a request to load data;
   asynchronously executing on the request to load data so as to obtain all available data responsive to the request;
   receiving a user-generated command subsequent to initiating execution on the request to load data;
   initiating execution on the user-generated command prior to completing said step of asynchronously executing on the request to load data; and
   loading the obtained data into the tree navigator graphical user interface.

2. The method of claim 1, further comprising the step of displaying at least a portion of the obtained data in the tree view display.

3. The method of claim 1, wherein said tree view display displays a plurality of objects in a tree representation, and wherein said request to load data comprises a request to load data associated with a first of said objects; and
   further comprising the step of loading additional data into the tree navigator graphical user interface that is associated with at least one object other than said first object in anticipation of a future request to load data.

4. The method of claim 3, wherein said step of loading additional data comprises the step of loading data that is associated with the child objects of said first object.

5. The method of claim 1, further comprising the step of displaying a portion of the obtained data before completing said step of asynchronously executing on the request to load data.

6. The method of claim 5, wherein said portion of the obtained data comprises data that was already loaded into the tree navigator graphical user interface at the time the request to load data is received.

7. The method of claim 5, wherein said tree view display displays a plurality of objects in a tree representation, and wherein said request to load data comprises a request to load data associated with a first of said objects; and
   further comprising the step of displaying said first object as a placeholder object during said step of asynchronously executing on the request to load data.

8. The method of claim 7, further comprising the step of replacing said placeholder object with a normal object once the data associated with said first object has been fully loaded into the tree navigator graphical user interface.

9. The method of claim 7, further comprising the step of replacing said placeholder object with a failure object if the step of asynchronously executing on the request to load data fails to obtain all available data responsive to the request.

10. The method of claim 1, further comprising the step of displaying a loading icon in the tree view display during the step of asynchronously executing on the request to load data that indicates that the tree navigator graphical user interface is in the process of executing on the request to load data.

11. The method of claim 1, wherein said tree view display displays a plurality of objects in a tree representation, and wherein each of said objects are associated with a subset of the data in said set of hierarchical data, and wherein said tree navigator graphical user interface further includes a data display area for displaying at least a portion of the data associated with one of said plurality of objects, and
   wherein said method further comprises the step of displaying a loading icon in the data display area during the step of asynchronously executing on the request to load data that indicates that the computer is in the process of executing on the request to load data.

12. The method of claim 1, further comprising the step of displaying an indicia of availability on the tree navigator graphical user interface during the step of asynchronously executing on the request to load data that indicates that the computer is available to receive additional commands.

13. The method of claim 8, wherein said normal object comprises an icon and wherein said placeholder object comprises a ghost representation of said icon.

14. The method of claim 9, wherein said normal object comprises an icon, and wherein said failure object comprises an "X" superimposed on said icon.

15. The method of claim 1, wherein the request to load data comprises a request to refresh data currently loaded in the tree navigator graphical user interface, and wherein said step of receiving a user-generated command comprises the step of receiving a user-generated command to manipulate the currently loaded data that is subject to the request to refresh.

16. The method of claim 3, further comprising the step of displaying in the tree view display, before completing said step of asynchronously executing on the request to load data, data responsive to the request to load data that was already loaded into the tree navigator graphical user interface at the time the request to load data is received.

17. The method of claim 1, wherein said tree view display displays a plurality of objects in tree representation, and wherein said request to load data comprises a request to refresh the data associated with a first of said objects that previously had no child objects, and further comprising the steps of:

displaying a loading icon on the tree view display during the step of asynchronously executing on the request to load data that indicates that the computer is still in the process of executing on the request to load data; and then displaying the child objects of the first of said object if the first of said objects now has child objects.

18. The method of claim 5, wherein said request to load data comprises a request to load all the child objects of a parent object, and wherein said step of displaying a portion of the obtained data comprises displaying in the tree view display a child object of the parent object before completing said step of asynchronously executing on the request to load data.

19. A system for loading data that is part of a set of hierarchical data into a tree navigator graphical user interface which includes a tree view display, the system comprising:

means for receiving a request to load data;

means for asynchronously executing on the request to load data so as to obtain all available data responsive to the request;

means for receiving a user-generated command subsequent to initiating execution on the request to load data;

means for initiating execution on the user-generated command prior to completing said step of asynchronously executing on the request to load data; and means for loading the obtained data into the tree navigator graphical user interface.

20. The system of claim 19, wherein said tree view display displays a plurality of objects in a tree representation, and wherein said request to load data comprises a request to load data associated with a first of said objects; and further comprising means for loading additional data into the tree navigator graphical user interface that is associated with at least one object other than said first object in anticipation of a future request to load data.

21. A computer program product for loading data that is part of a set of hierarchical data into a tree navigator graphical user interface which includes a tree view display, the computer program product comprising:

a computer-readable storage medium having computer-readable program code means embodied in said medium, said computer-readable program code means comprising:

computer-readable program code means for receiving a request to load data;

computer-readable program code means for asynchronously executing on the request to load data so as to obtain all available data responsive to the request;

computer-readable program code means for receiving a user-generated command subsequent to initiating execution on the request to load data;

computer-readable program code means for initiating execution on the user-generated command prior to completing said step of asynchronously executing on the request to load data; and computer-readable program code means for loading the obtained data into the tree navigator graphical user interface.

22. The computer program product of claim 21, wherein said tree view display displays a plurality of objects in a tree representation, and wherein said request to load data comprises a request to load data associated with a first of said objects; and further comprising computer-readable program code means for loading additional data into the tree navigator graphical user-interface that is associated with at least one object other than said first object in anticipation of a future request to load data.

* * * * *